(12) United States Patent
Raster et al.

(10) Patent No.: US 6,891,292 B2
(45) Date of Patent: May 10, 2005

(54) SERIES OF MOTORS

(75) Inventors: Thomas Raster, Tübingen (DE); Michael Ehrmann, Tübingen (DE)

(73) Assignee: Flender Tübingen GmbH (DE)

(*) Notice: Subject to any disclaimer, the term of this patent is extended or adjusted under 35 U.S.C. 154(b) by 0 days.

(21) Appl. No.: 10/641,867

(22) Filed: Aug. 15, 2003

(65) Prior Publication Data
US 2004/0032178 A1 Feb. 19, 2004

(30) Foreign Application Priority Data
Aug. 16, 2002 (DE) .......................... 102 38 336

(51) Int. Cl.⁷ .............................................. H02K 7/00
(52) U.S. Cl. ..................................... 310/75 D; 310/118
(58) Field of Search ........................... 310/67 R, 75 D, 310/118, 75 R, 112, 114, 68 A, 71

(56) References Cited

U.S. PATENT DOCUMENTS

| | | | | |
|---|---|---|---|---|
| 1,928,637 A | * | 10/1933 | Williams | 188/166 |
| 2,098,958 A | * | 11/1937 | Ekstromer | 310/112 |
| 2,240,569 A | * | 5/1941 | Myers | 310/87 |
| 2,539,459 A | * | 1/1951 | Myrmirides | 310/113 |
| 2,698,394 A | * | 12/1954 | Brown | 310/112 |
| 4,323,828 A | * | 4/1982 | Terada et al. | 318/45 |
| 4,329,122 A | * | 5/1982 | Owada et al. | 417/365 |
| 4,373,147 A | * | 2/1983 | Carlson, Jr. | 318/48 |
| 4,429,242 A | * | 1/1984 | Layh | 310/71 |
| 4,506,178 A | | 3/1985 | Bukoschek et al. | 310/41 |
| 5,017,818 A | * | 5/1991 | Dohogne | 310/71 |
| 5,412,272 A | * | 5/1995 | Mensching | 310/88 |

FOREIGN PATENT DOCUMENTS

| | | |
|---|---|---|
| DE | 1 763473 | 1/1972 |
| DE | 3806392 | 9/1989 |
| DE | 3840281 | 5/1990 |
| DE | 4225158 | 2/1994 |
| DE | 4225496 | 2/1994 |
| DE | 19808797 | 9/1999 |
| DE | 29920785 | 2/2000 |
| DE | 19924735 | 3/2001 |
| EP | 0 325 787 | 8/1989 |
| EP | 0 942513 | 9/1999 |
| JP | 07274433 | 10/1995 |
| WO | WO 99/54634 | 10/1999 |
| WO | WO 02/063747 | 8/2002 |

\* cited by examiner

*Primary Examiner*—Dang Le
(74) *Attorney, Agent, or Firm*—R W Becker & Associates; Robert W Becker

(57) ABSTRACT

A series of fabricated products for electrically rotatably driven machines, especially alternating current motors for attachment on drives, for alternating current motors having various pole configurations and operable in differing performance classes, voltage classes, and frequency classes, includes a plurality of trunk motors each having a motor housing, a motor terminal box for the provision of electrical current to stator windings mounted in a rotationally symmetrical manner in the motor housing, and a rotor. The rotor has a shaft supported on a bearing bracket. The trunk motor also includes a drive side, a non-drive side, and a shaft end extending outwardly from the non-drive side adapted for the securement thereto of a plurality of differing attachment shafts.

18 Claims, 8 Drawing Sheets

Fig. 4.1
Fig. 6.1
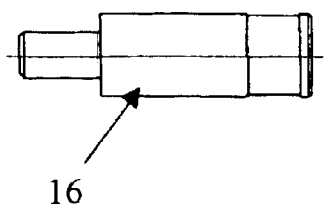
16
Fig. 7.1
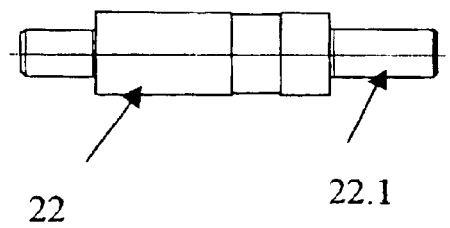
22          22.1
Fig. 8.1
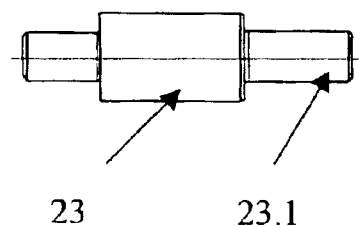
23      23.1
Fig. 9.1
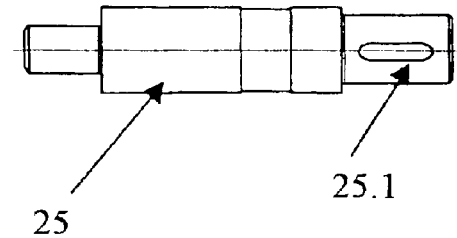
                25.1
25
Fig. 10.1
Fig. 11.1
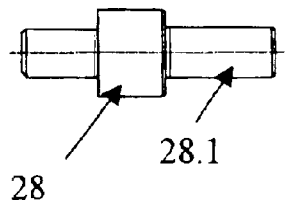
      28.1
28
Fig. 12.1
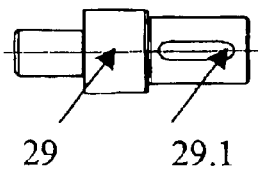
29      29.1

SERIES OF MOTORS

BACKGROUND OF THE INVENTION

The present invention relates to a series of motors, especially a series of motors for attachment on drives, for alternating current motors having different pole configurations, and operable in different performance classes, voltage classes, and frequency classes.

In connection with a series of motors, in the interest of producing a cost favorable assembly and an economical motor supply inventory, one has particularly endeavored to configure the various motors of a series of motors with the greatest possible number of differing attachments and accessories within the purview of a common configuration, in order to maintain a large number of motor variations which, from the point of view of their individual functions and operations, are widely different from one another.

It has heretofore been necessary to produce the complete motor variations, or a multitude of the different principal motor components such as, for example, stators, terminal boxes, rotors or armatures, bearing brackets, and so forth, as individually configured assemblies with required corresponding functions and operational configurations and to maintain inventories of such individually configured assemblies in an uneconomical manner.

SUMMARY OF THE INVENTION

The present invention offers a solution to the challenge of providing a series of motors for alternating current motors having different pole configurations, operable in different performance classes, voltage classes, and frequency classes, and offering a very large variety of typical motor specifications or accessory functions which fulfill, in considerable measure, the requirements for a cost-favorable assembly and economical supply inventory storage thereof without limiting the performance range and the function range and or limiting the required deployment venues of the motors.

In accordance with the inventive series of motors, it is possible, in dependence upon the required number of poles and the required performance classes, voltage classes, and frequency classes of the respective motor, to assemble in a simple manner the necessary attachment pieces and accessory pieces—that is, the ventilators, brake apparatus, transmitters, and reversal stops as well as the second motor shaft ends, or combinations of these various attachment pieces and accessory pieces, into a trunk motor in order to assemble together in this manner the required complete motor variant. In this connection, there is thereby made available a range of variations having a base module "trunk motor" among the motor assembly offerings or, generally, among the offerings of electrically rotatably driven machines, which have heretofore not been available in this form.

Further advantages in connection with the assembly costs and the economical supply inventory storage permit, in particular, the realization of configurations in which the deployed attachment pieces and accessory pieces, which are respectively exchangeable, need be manufactured only on the first pass and then held in inventory. As the occasion arises, the attachment pieces and accessory pieces are exchangeable among differing motor sizes and dimensions. In this connection, the attachment pieces and accessory pieces can even be produced for assembly into any one of a range of motor sizes. Due to the reason of the relatively lower inventory of attachment pieces and accessory pieces, the costs for the assembly as well as for the storage of supply inventory can be strongly reduced to an economically advantageous order of magnitude.

In connection with a further integration of the necessary assembly components, the bearing bracket comprises, on the non-drive side (the NS-side) of the motor or, as this side is alternatively designated, the so-called ventilation side (the BS-side) of the motor, a unitary configuration corresponding to the respective motor size which is, in fact, independent of the various performance classes, the number of poles specified as a function of the rate of rotation, and the variously selectable functions and operational configuration of the motor. In this manner, cost favorable production and economic supply inventory storage are achieved such that the various motors of a given motor configuration size can be assembled with the greatest possible number of similar attachment pieces and accessory pieces in accordance with the principle of unit construction.

Further advantages of the invention are set forth in the hereinafter following descriptions of various embodiments of the invention.

BRIEF DESCRIPTION OF THE DRAWINGS

FIG. 4.1 is a front elevational view of an attachment shaft for the motor variation shown in FIG. 4;

FIG. 6.1 is a front elevational view of an attachment shaft for the motor variation shown in FIG. 6 configured in the manner of the attachment shaft shown in FIG. 4.1;

FIG. 7.1 is a front elevational view of an attachment shaft of the variation of the motor shown in FIG. 7;

FIG. 8.1 is a front elevational view of an attachment shaft for the motor variation shown in FIG. 8;

FIG. 9.1 is a front elevational view of an attachment shaft for the motor variation shown in FIG. 9;

FIG. 10.1 is a front elevational view of an attachment shaft for the motor variation shown in FIG. 10;

FIG. 11.1 is a front elevational view of an attachment shaft for the motor variation shown in FIG. 11, configured in correspondence with the attachment shaft shown in FIG. 10.1;

FIG. 12.1 is a front elevational view of an attachment shaft for the motor variation shown in FIG. 12.

DETAILED DESCRIPTION OF THE PREFERRED EMBODIMENTS

Figure 1:
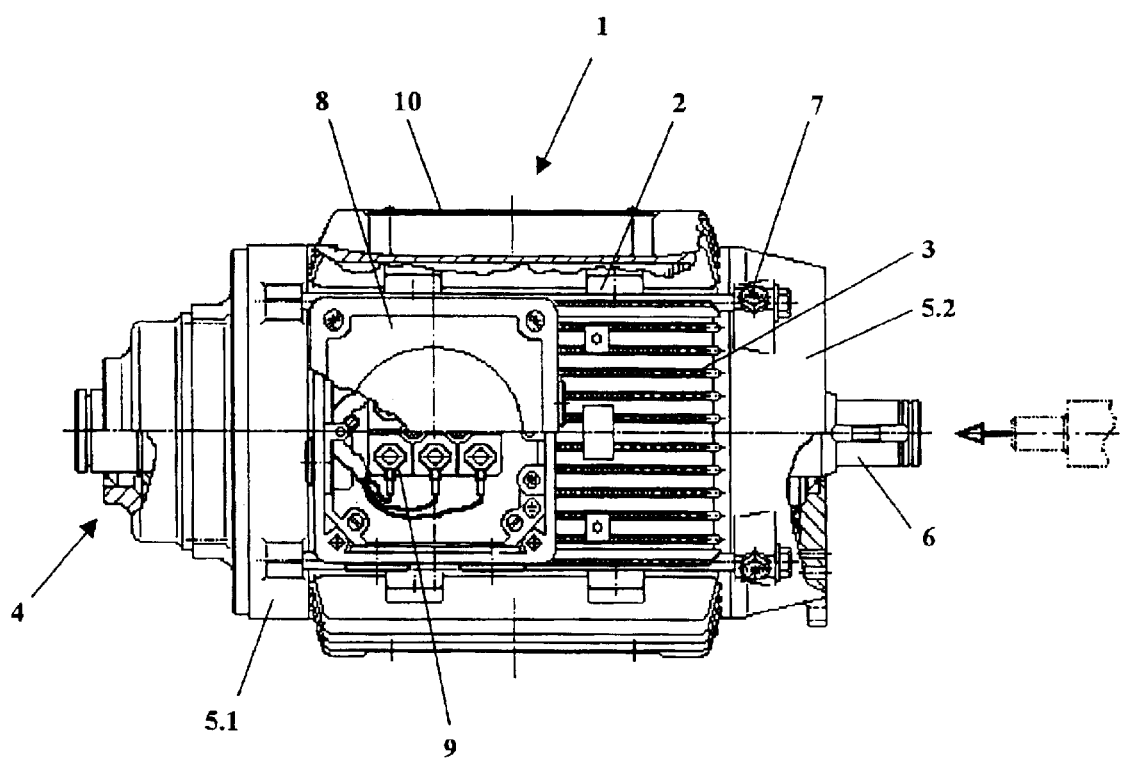
FIG. 1 is a front elevational sectional view of one embodiment of the inventive trunk motor for assembling with various attachment pieces and accessory pieces.

FIG. 1 shows one embodiment of the trunk motor of the present invention, hereinafter designated as the trunk motor 1, and comprising a motor housing 2, preferably formed of die cast aluminum in a form-stable construction and having ribs 3 for top surface cooling of the trunk motor 1. The trunk motor 1 comprises, on one side thereof—namely, the drive side or AS-side thereof—a bearing bracket 5.1 and a drive or power transmission interface 4, which is especially configured for a direct take-off drive attachment, and, on the other side thereof—namely, the non-drive side (NS-side or BS-side), a unitary bearing bracket 5.2. The rotor or armature of the trunk motor 1 is disposed in the bearing brackets 5.1 and 5.2, the rotor or armature comprising, on the so-called non-drive BS-side, a unitary shaft end 6 operable for the securement thereto of various attachment shafts. The shaft end 6 is configured for the various attachment shafts in that, on the shaft end 6, there is formed an attachment configuration such as, for example, a smooth bore or a threaded configuration or the like operable for securing a force locking or form locking attachment shaft. The top surface of the shaft end 6 is configured such that the attachment pieces can be secured thereto without mechanical working.

As can be further seen in FIG. 1, securement bolts 7, preferably in the configuration of multi-turn bolts, are provided for securing a not-illustrated ventilation hood which is preferably mounted via a bayonet securement. In this connection, the multi-turn bolts are preferably pre-assembled in the bearing bracket 5.2 of the trunk motor 1.

It can be further seen in FIG. 1 that the trunk motor also comprises a terminal box 8 which is shown in partial sectional view. The terminal box 8 is of a configuration such that the introduction thereinto of a cable for, as well, the electrical connections to the attachment pieces, can be performed without further mechanical working. Moreover, the terminal box 8 can turn through respective 90° angles around the attachment surfaces without it being necessary that the introduction of the cables requires a mechanical working. In this connection, a terminal board 9 which is, preferably, configured as a six-pole terminal board, and a complete protective conductor connector are provided, as well as securement possibilities for connection elements comprised of individual pieces such as, for example, a rectifier, a capacitor, or other similar attachment pieces and accessory pieces. Additionally, several securement devices for the rating plate are provided on the top surface of the trunk motor 1. In this connection, a rating plate 10 is illustrated.

Figure 2:
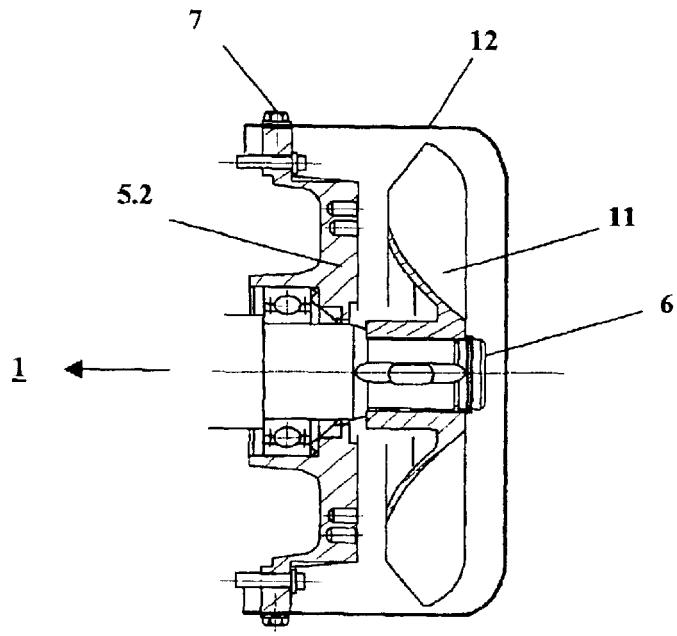
FIG. 2 is a front elevational sectional view of one variation of the inventive motor with an attachment piece in the form of a standard fan in accordance with the present invention.

FIG. 2 illustrates solely the unitary bearing bracket 5.2 and the shaft end 6 of the trunk motor 1 with a standard fan 11 preferably comprised of glass-reinforced synthetic material or plastic which provides organic or self ventilation to the trunk motor. The standard fan 11 is connected via rabbeting to the shaft end 6 of the trunk motor 1. Moreover, a first hood 12 is illustrated which is mounted on the securement bolts 7 of the bearing bracket 5.2 of the trunk motor 1 via a bayonet securement.

Figure 3:
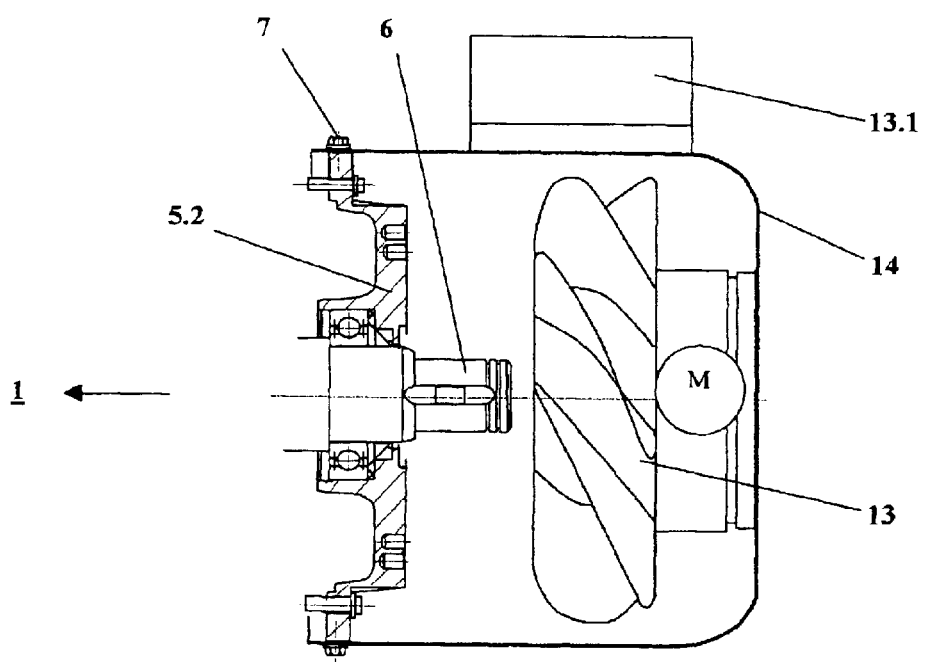
FIG. 3 is a front elevational sectional view of another variation of the inventive motor having the attachment piece of an external ventilator in accordance with the present invention.

FIG. 3 illustrates a variation of the inventive motor with the attachment piece of an external ventilator 13 with a terminal box 13.1. The external ventilator 13 is disposed on the inner side of a second hood 14 which is oppositely disposed to the shaft end 6 of the trunk motor 1. In this connection, the terminal box 13.1 of the external ventilator 13 is preferably provided with a capacitor so that the motor of the external ventilator can be selectively driven with three phase current or single phase alternating current.

The external ventilator 13 is preferably deployed if the motor cannot be sufficiently ventilated by a standard fan such as is the case, for example, in connection with relatively long continuous running time, operation as a rectifier inverter, and so forth, or if the configuration does not permit a standard fan capability. The ventilation hood 14 encloses the shaft end 6 and the external ventilator 13 and is likewise mounted on the securement bolts 7 of the bearing bracket 5.2 of the trunk motor 1 via a bayonet securement.

Figure 4:
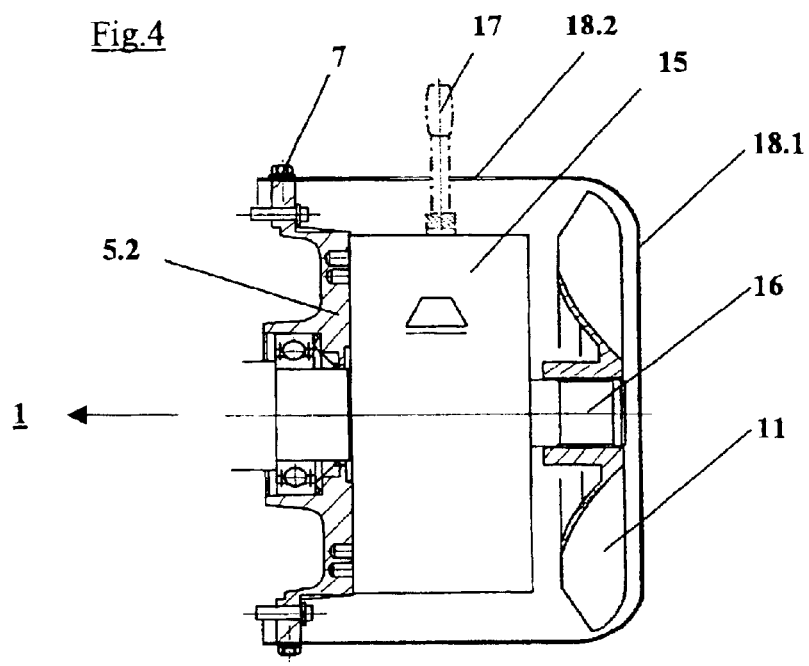
FIG. 4 is a front elevational sectional view of an additional variation of the inventive motor with the attachment pieces of a brake device and a standard fan in accordance with the present invention.

FIG. 4 illustrates another variation of the inventive motor, whereby there are provided as attachment pieces a brake device 15 which is, for example, an electromechanical brake or the like, and the standard fan 11 for self-ventilation, mounted on a first attachment shaft 16, as shown in FIG. 4.1. The standard fan 11 is secured to the attachment shaft 16 preferably via a force locking connection by means of tolerance collars. The attachment shaft 16 is connected with a not-illustrated shaft end 6 of the trunk motor 1 preferably via a press-fit/adhesive connection. The rotor of the brake device is preferably secured via a rabbeting connection to the shaft end 6 of the trunk motor 1. In this connection, the housing of the brake device 15 is connected via bolts to the unitary bearing bracket 5.2 and, in fact, preferably via self-tapping bolts which are received in bores provided in the bearing bracket 5.2. The brake device 15 can be selectively ventilated with an indicated hand-operated release lever 17 which projects out of a slot 18.2 provided in a third hood 18.1. The third hood 18.1, which is configured with the slot 18.2, encloses the brake device 15 and the standard fan 11 in a protective manner and is likewise secured on the securement bolts 7 of the bearing bracket 5.2 of the trunk motor 1 via a bayonet securement.

Drive motors are selectively configured with an electromechanical brake device 15 assembled on the non-drive side (BS-side). Preferably, a spring-biased disc brake is deployed, whereby, with help of the hand-operated release lever 17, a manual ventilation of the motor is possible following, for example, a cessation of the current or in connection with positioning work, in lieu of the otherwise normally deployed ventilation effected in an electromagnetic manner. Alternatively, other brake devices can be assembled therein such as, for example, operating current-actuated brake devices.

Figure 5:
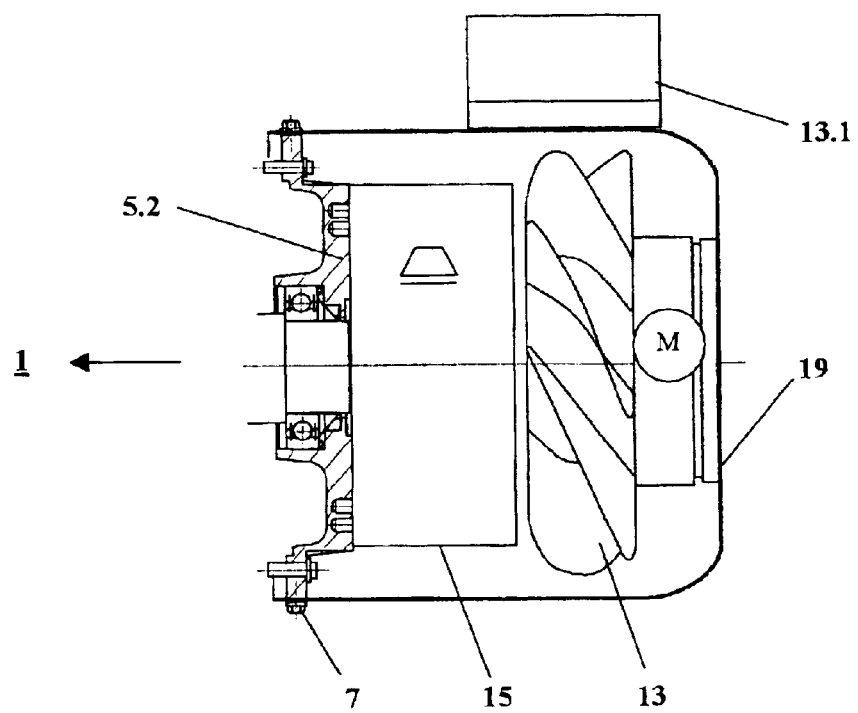
FIG. 5 is a front elevational sectional view of a further variation of the inventive motor having the attachment pieces of a brake device and an external ventilator in accordance with the present invention.

FIG. 5 shows a variation of the inventive motor with the attachment pieces of an electro-mechanical brake device 15, which is mounted on the not-illustrated shaft end 6 of the trunk motor 1 via a rabbeting connection, and an external ventilator 13 with a terminal box 13.1. In this connection, the external ventilator 13 is further arranged on the inner side of a fourth hood 19 in axial adjacent disposition to the brake device 15. The ventilation hood 19 encloses the brake device 15 and the external ventilator 13 in protective manner and is likewise connected to the securement bolts 7 of the bearing bracket 5.2 of the trunk motor 1 via a bayonet securement.

Figure 6:
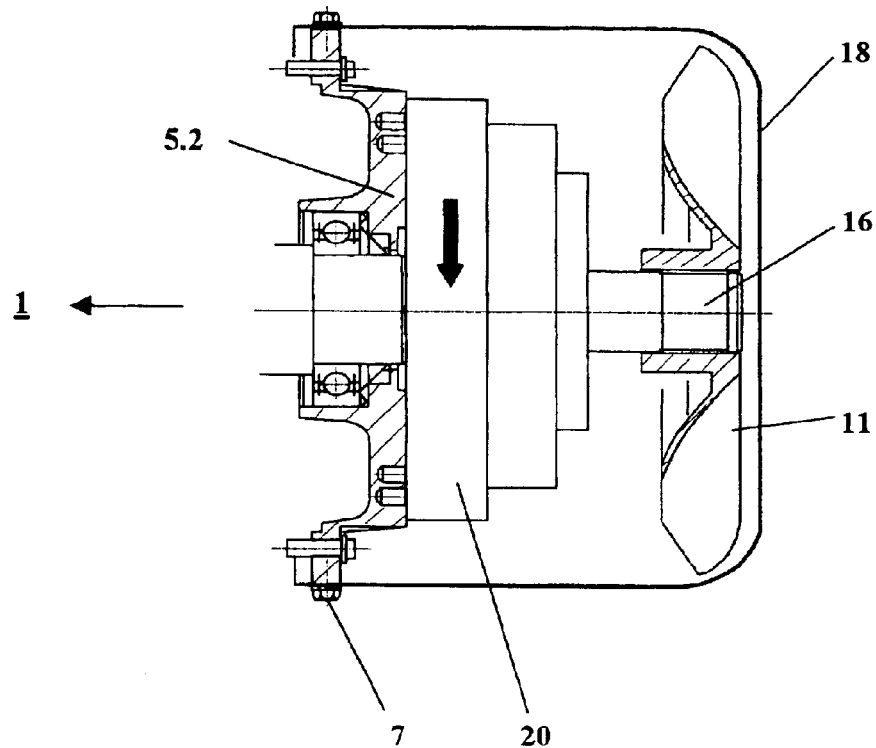
FIG. 6 is a front elevational sectional view of a further additional variation of the inventive motor with the attachment pieces of a reversal stop and standard fan in accordance with the present invention.

FIG. 6 illustrates a variation of the inventive motor with the attachment pieces of a reversal stop 20 and the standard fan 11. Motors having the mechanical reversal stops are deployed if a reverse direction operation of, in particular, the de-activated drive, should be prevented. In the illustrated variation, the reversal stops 20 and the standard fan 11 are arranged on a first drive shaft 16, shown in FIG. 6.1, which corresponds to the drive shaft illustrated in FIG. 4.1 and which is connected with the non-illustrated shaft end 6 of the trunk motor 1. The attachment pieces are furthermore protected by a third hood 18 which is mounted on the securement bolts 7 of the bearing bracket 5.2 of the trunk motor 1 via a bayonet securement.

Figure 7:
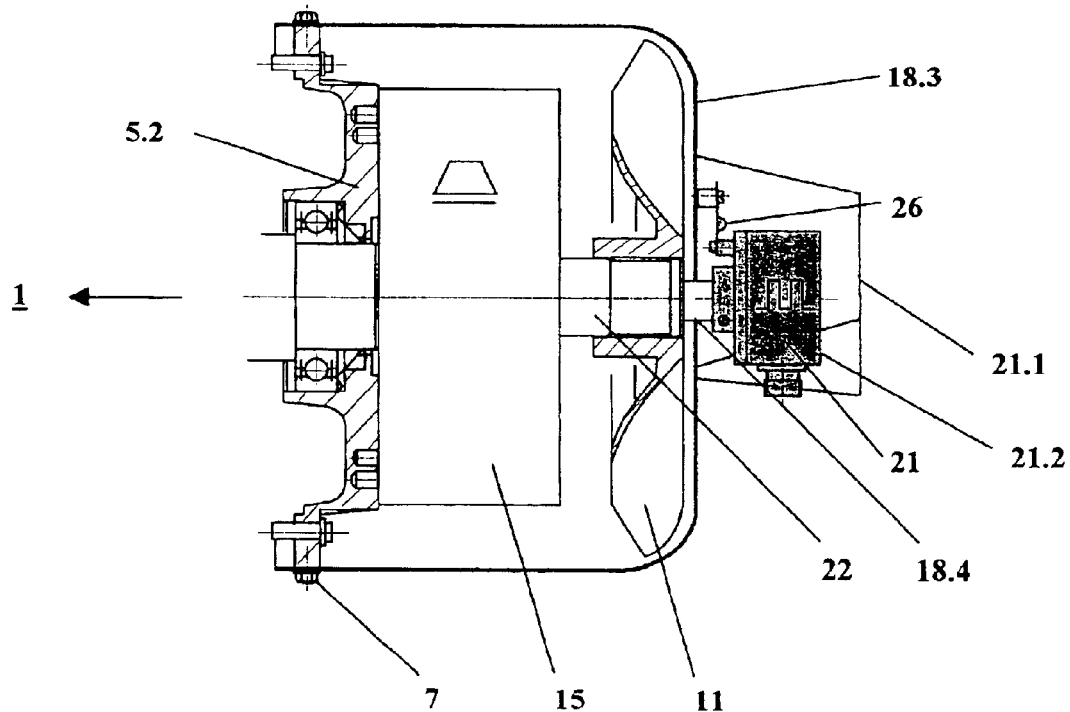
FIG. 7 is a front elevational sectional view of a supplemental variation of the inventive motor with the attachment pieces of a brake device, standard fan, and transmitter in accordance with the present invention.

FIG. 7 illustrates another variation of the inventive motor. In this variation, the attachment pieces of the brake device 15 and the standard fan 11 as well as an attachment piece in the form of a transmitter 21 having a transmitter protection hood 21.1 are arranged in serial manner one behind another on a second attachment shaft 22, which is illustrated in FIG. 7.1. In this connection, a shaft end 22.1 of the second attachment shaft 22 with the transmitter device 21 disposed thereon projects out of a bore 18.4 of a third hood 18.3, which encloses the attachment pieces of the brake device 15 and the standard fan 11 and is mounted on the securement bolts 7 of the bearing bracket 5.2 of the trunk motor 1 via a bayonet securement. The transmitter housing 21.2 of the transmitter 21 is assembled via a first torque support 26 in a rotation-blocked manner to the third hood 18.3. The transmitter 21 is disposed in a protected manner under the transmitter protection hood 21.1 which, itself, is secured on the ventilation hood 18.3.

The transmitter 21 can be configured, for example, as an absolute value transmitter, an incremental transmitter, a tachometer, a proximity switch having inductive, capacitative, optical, or other capability, a centrifugal force switch, and the like. The shaft end 22.1 of the second attachment shaft 22 is always so configured such that the range of a series of motors which are produced can always use the same transmitter 21. The rotor of the transmitter 21 is preferably secured via clamping rings to the shaft end 22.1 of the second attachment shaft 22. The securement of the transmitter protection hood 21.1 is configured such that this hood can be deployed for several different sizes of motors.

Figure 8:
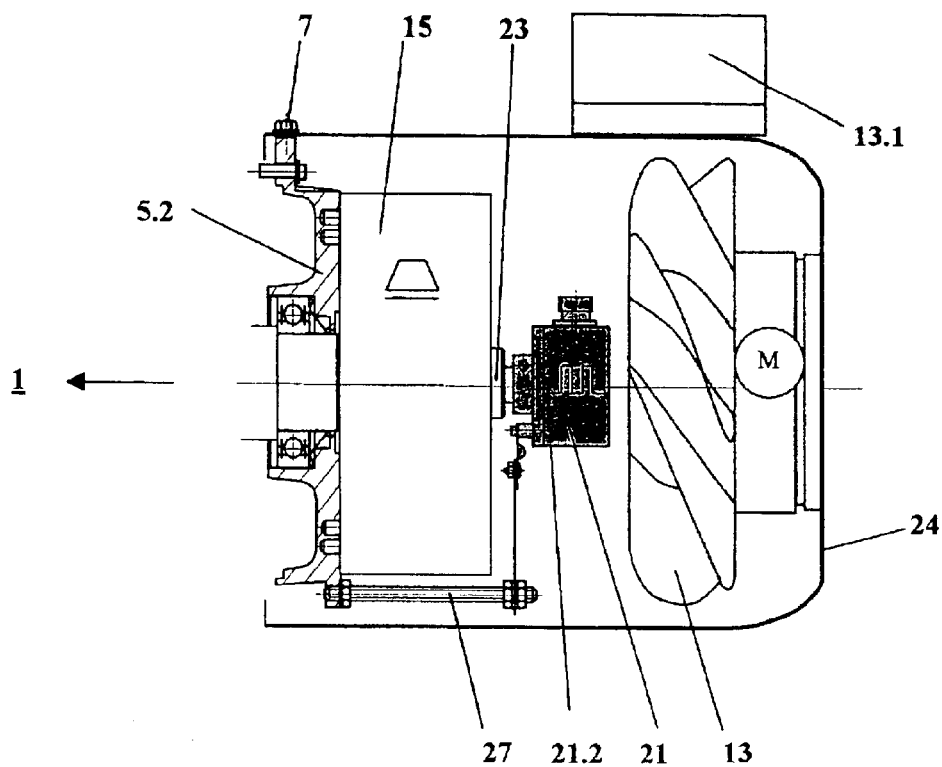
FIG. 8 is a front elevational sectional view of an additional supplemental variation of the inventive motor with the attachment pieces of a brake device, a transmitter, and an external ventilator in accordance with the present invention.

FIG. 8 illustrates another variation of the inventive motor having the attachment pieces of the brake device 15 and the transmitter 21 as well as the external ventilator 13 with the terminal box 13.1. In this variation, the brake device 15 and the transmitter 21 are disposed on a third attachment shaft 23, as is illustrated in FIG. 8.1, which is, in turn, connected with the not-illustrated shaft end 6 of the trunk motor 1, whereby the transmitter 21 is mounted on a shaft end 23.1 of the third attachment shaft 23.

In this configuration, the transmitter 21 is secured via a second torque support 27 in a rotation-blocked manner onto the bearing bracket 5.2 of the trunk motor 1. The external ventilator 13 is mounted, as viewed in the axial direction, on the inner side of a fifth hood 24 which is disposed in opposition to the transmitter 21. The fifth hood 24 encloses the brake device 15, the transmitter 21, and the external ventilator 13 and is, likewise, mounted to the securement bolts 7 of the bearing bracket 5.2 of the trunk motor 1 via a bayonet securement.

Figure 9:
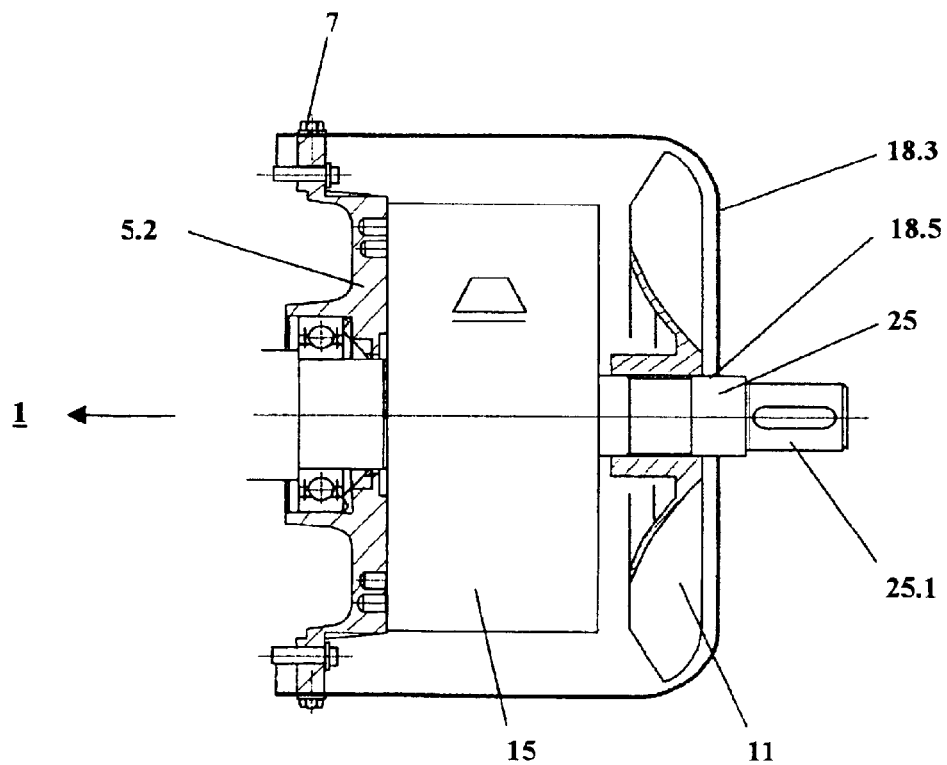
FIG. 9 is a front elevational sectional view of a further supplemental variation of the inventive motor with the attachment pieces of a brake device, a standard fan, and a second shaft end in accordance with the present invention.

FIG. 9 illustrates another variation of the inventive motor, whereby the brake device 15 and the standard fan 11 for self-ventilation of a fourth attachment shaft 25, which is illustrated in FIG. 9.1, are provided as attachment pieces. The fourth attachment shaft 25 is connected with the shaft end 6 of the trunk motor 1 preferably via a press fit/adhesive connection. In this connection, a shaft end 25.1 of the fourth attachment shaft 25 or, alternatively as well, a so-called second motor shaft end, projects through another bore 18.5 of a third hood 18.3. The ventilation hood 18.3 encloses the brake device 15 and the standard fan 11 and is likewise secured to the securement bolts 7 of the bearing bracket 5.2 of the trunk motor 1 via a bayonet securement. The shaft end 25.1 of the fourth attachment shaft 25 provides for the mounting thereon of selected accessory pieces such as, for example, a hand wheel or crank lever or so forth which permit a manual positioning or which permit customer attachment of a rotation monitoring device or, additionally, which permit the take-off driving of assistance assemblies such as, for example, a cooling medium pump.

Figure 10:
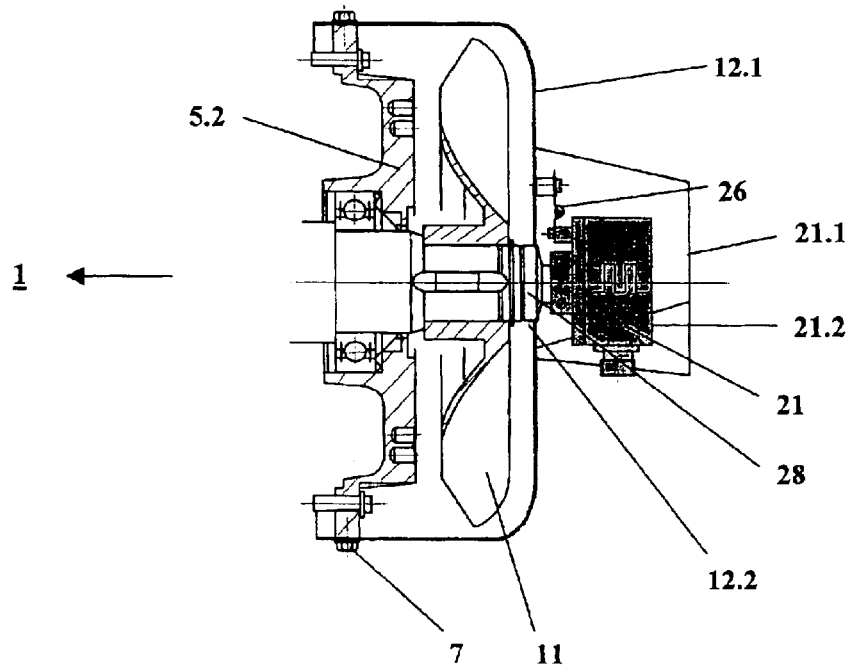
FIG. 10 is a front elevational sectional view of yet another variation of the inventive motor with the attachment pieces of a standard fan and a transmitter in accordance with the present invention.

FIG. 10 illustrates another variation of the inventive motor having the attachment pieces of the transmitter 21 and the standard fan 11, whereby the standard fan 11 is mounted on the shaft end 6 of the trunk motor 1. A fifth attachment shaft 28, which is illustrated in FIG. 10.1, is secured to the shaft end 6 of the trunk motor 1 preferably via a press fit/adhesive connection. The fifth attachment shaft 28 comprises a shaft end 28.1 on which the transmitter 21 is mounted. The housing 21.2 of the transmitter 21 is secured via a first torque support 26 in a rotation-blocked manner to a first hood 12.1 which is provided with a bore 12.2. The transmitter 21 is protectively enclosed underneath the transmitter protection hood 21.1 which, itself, is mounted on the ventilation hood 12.1. The ventilation hood 12.1 is provided with the bore 12.2 for the passage therethrough of the fifth attachment shaft 28. The ventilation hood 12.1 protects the standard fan 11 and is likewise secured to the securement bolts 7 of the bearing bracket 5.2 of the trunk motor 1 via a bayonet securement.

Figure 11:
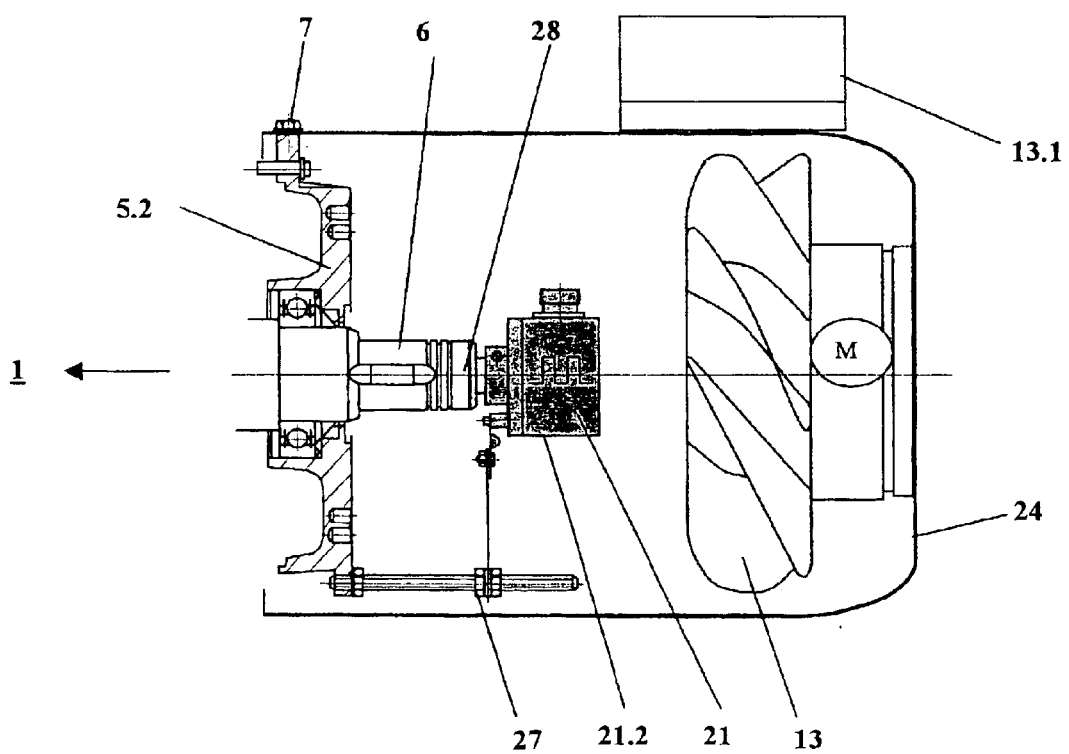
FIG. 11 is a front elevational sectional view of still another variation of the inventive motor with the attachment pieces of a transmitter and an external ventilator in accordance with the present invention.

FIG. 11 shows a variation of the inventive motor having the transmitter 21 as well as the external ventilator 13 with the terminal box 13.1 as attachment pieces. In this variation, the transmitter 21 is mounted on the fifth attachment shaft 28, which is illustrated in FIG. 11.1 and is a shaft configured in correspondence with the shaft illustrated in FIG. 10.1, and the transmitter 21 is further connected with the shaft end 6 of the trunk motor 1 via, preferably, a press fit/adhesive connection, whereby the transmitter 21 is mounted on the shaft end 28.1 of the fifth attachment shaft 28. In this variation, the transmitter 21 is mounted by means of the second torque support 27 in a rotation-blocked manner on the bearing bracket 5.2 of the trunk motor 1. The external ventilator 13 is, as viewed in the axial direction, mounted on the inner side of the fifth hood 24 which is in opposition to the transmitter 21. The ventilation hood 24 is likewise mounted on the securement bolts 7 of the bearing bracket 5.2 of the trunk motor 1 via a bayonet securement.

Figure 12:
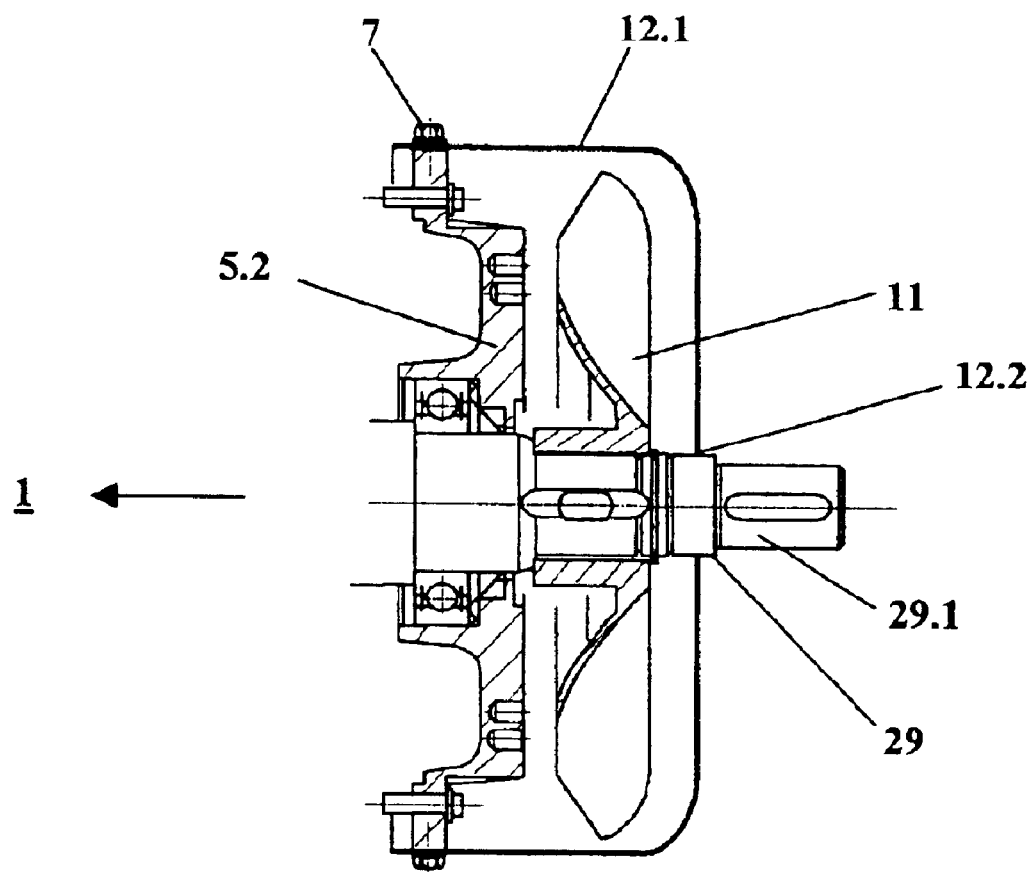
FIG. 12 is a front elevational sectional view of an additional further variation of the inventive motor with the attachment pieces of a standard fan and a second shaft end in accordance with the present invention.

FIG. 12 illustrates another variation of the inventive motor, whereby an attachment piece in the form of the standard fan 11 for self-ventilation is mounted on a sixth attachment shaft 29, which is illustrated in FIG. 12.1. The sixth attachment shaft 29 is secured to the shaft end 6 of the trunk motor 1 preferably via a press fit/adhesive connection. In this connection, a shaft end 29.1 of the sixth attachment shaft 29 projects through a bore 12.2 of a first hood 12.1 which encloses the standard fan 11 in a protective manner and is likewise secured through the securement bolts 7 of the bearing bracket 5.2 of the trunk motor 1 via a bayonet securement. The shaft end 29.1 serves as a so-called second motor shaft end for the attachment thereto of selected accessory pieces such as, for example, a hand wheel or crank lever or so forth which permit a manual positioning or which permit customer attachment of a rotation monitoring device or, additionally, which permit the take-off driving of assistance assemblies such as, for example, a cooling medium pump.

The above-described variations of the inventive motor relate to a series of motors but such variations are also deployable, in obvious manner, in general for series of electrically rotatably driven machines such as, for example, generators.

The specification incorporates by reference the disclosure of German priority document DE 102 38 336.7 filed Aug. 16, 2002.

The present invention is, of course, in no way restricted to the specific disclosure of the specification and drawings, but also encompasses any modifications within the scope of the appended claims.

What is claimed is:

1. A series of motors, especially for attachment on drives, for alternating current motors having various pole configurations and operable in differing performance classes, voltage classes, and frequency classes, the series of motors comprising:
   a plurality of trunk motors, each trunk motor including:
      a motor housing optionally having ribs formed thereon for cooling assistance;
      stator windings mounted in a rotationally symmetrical manner in the motor housing;
      a rotor having a trunk motor shaft;
      a motor terminal box having a terminal board for the connection thereto of a current supply for the provision of electrical current to the stator windings;
      a pair of bearing brackets for supporting the shaft of the rotor such that the rotor is disposed within the stator windings at a minimal clearance therefrom sufficient to permit rotation of the rotor relative to the stator windings;
      a drive side;
      a non-drive side; and
      a shaft end of the trunk motor shaft extending outwardly from the non-drive side, the shaft end being adapted for securement thereto of a plurality of differing attachment shafts, the series of motors being configured such that each trunk motor is operable in cooperation with a plurality of differing attachment pieces and accessory pieces connected to the plurality of various attachment shafts.

2. A series of motors according to claim 1, and further comprising a standard fan mounted on the shaft end of the trunk motor as an attachment piece and a first hood enclosing the standard fan, the first hood being mounted on the bearing bracket of the trunk motor, including being mounted optionally via a bayonet securement and optionally via securement bolts of the bearing bracket.

3. A series of motors according to claim 1, and further comprising an external ventilator mounted on an inner side of a hood which is oppositely disposed to the shaft end of the trunk motor, the hood enclosing the external ventilator and the hood being mounted on the bearing bracket of the trunk motor, including being mounted optionally via a bayonet securement and optionally via securement bolts of the bearing bracket.

4. A series of motors according to claim 1, further comprising a brake device and a standard fan mounted on a first drive shaft as attachment pieces, the first drive shaft being connected with the shaft end of the trunk motor, and a hood which encloses the brake device and the standard fan and the hood being mounted on the bearing bracket of the trunk motor, including being mounted optionally via a bayonet securement and optionally via securement bolts of the bearing bracket.

5. A series of motors according to claim 4, wherein the brake device is provided with a hand-operated release lever for manual releasing in lieu of the otherwise normally deployed releasing effected in an electro-magnetic manner, the hand-operated release lever projecting out of a slot in the hood.

6. A series of motors according to claim 1, further comprising a brake device mounted on the shaft end of the trunk motor as an attachment piece and an external ventilator, whereby the external ventilator is mounted on the inner side of a hood in axial oppositional relation to the brake device, the hood enclosing the brake device and the external ventilator and the hood being mounted on the bearing bracket of the trunk motor, including being mounted optionally via a bayonet securement and optionally via securement bolts of the bearing bracket.

7. A series of motors according to claim 1, and further comprising a reversal stop and a standard fan as attachment pieces mounted on a first attachment shaft, whereby the first attachment shaft is connected with the shaft end of the trunk motor, and a hood enclosing the reversal stop and the standard fan, the hood being mounted on the bearing bracket of the trunk motor, including being mounted optionally via a bayonet securement and optionally via securement bolts of the bearing bracket.

8. A series of motors according to claim 1, and further comprising a brake device, a standard fan, and a transmitter mounted in serial manner one behind the other on a first attachment shaft, whereby the first attachment shaft is connected with the shaft end of the trunk motor, the first attachment shaft having a shaft end which, along with the transmitter mounted thereon, extends outwardly of a shaft end hood through a bore formed therein, a transmitter housing mounted via a first torque support in a rotation blocked manner on the shaft end hood, the third hood enclosing the brake device and the standard fan and the shaft end hood being mounted on the bearing bracket of the trunk motor, including being mounted optionally via a bayonet securement and optionally via securement bolts of the bearing bracket, and a transmitter protection hood under which the transmitter is protectively disposed, the transmitter protection hood being mounted on the shaft end hood.

9. A series of motors according to claim 1, and further comprising a brake device and a transmitter as attachment pieces mounted on a third first attachment shaft, an external ventilator, the first attachment shaft being connected with the shaft end of the trunk motor, a transmitter being mounted on a shaft end of the first attachment shaft, a hood enclosing the brake device, the transmitter, and the external ventilator, the external ventilator being mounted on the inner side of the hood in opposition, as viewed in the axial direction, to the transmitter, and the hood being mounted on the bearing bracket of the trunk motor, including being mounted optionally via a bayonet securement and optionally via securement bolts of the bearing bracket.

10. A series of motors according to claim 1, and further comprising a brake device and a standard fan as attachment pieces mounted on a first attachment shaft, the first attachment shaft being connected to the shaft end of the trunk motor and having a shaft end projecting outwardly of a hood through a bore therein, the hood enclosing the brake device and the standard fan in a protective manner and the hood being mounted on the bearing bracket of the trunk motor, including being mounted optionally via a bayonet securement and optionally via securement bolts of the bearing bracket, and a selected one of the shaft end of the first attachment shaft and a second motor shaft end being configured for the mounting thereon of selected accessory pieces such as, for example, a hand wheel or crank lever or so forth which permit a manual positioning or which permit customer attachment of a rotation monitoring device or, additionally, which permit the take-off driving of assistance assemblies such as, for example, a cooling medium pump.

11. A series of motors according to claim 1, and further comprising a standard fan and a transmitter as attachment pieces mounted on a fifth first attachment shaft in serial manner one behind the other, the first attachment shaft being connected with the shaft end of the trunk motor and having a shaft end, with the transmitter mounted thereon, projecting outwardly of a hood through a bore formed therein, a transmitter housing being mounted via a first torque support in a rotation-blocked manner on the hood, and a transmitter protection hood under which the transmitter is protectively disposed, the transmitter protection hood being mounted on the hood, and the hood being mounted on the bearing bracket of the trunk motor, including being mounted optionally via a bayonet securement and optionally via securement bolts of the bearing bracket.

12. A series of motors according to claim 1, and further comprising a transmitter as an attachment piece mounted on a first attachment shaft, an external ventilator, the first attachment shaft being connected to the shaft end of the trunk motor, the transmitter being mounted via a torque support in a rotation blocked manner on the shaft end of the first attachment shaft, the external ventilator being mounted on the inner side of a hood in opposition, as viewed in the axial direction, to the transmitter, and the hood being mounted on the bearing bracket of the trunk motor, including being mounted optionally via a bayonet securement and optionally via securement bolts of the bearing bracket.

13. A series of motors according to claim 1, and further comprising a standard fan as an attachment piece mounted on a first attachment shaft, the first attachment shaft being connected to the shaft end of the trunk motor and having a shaft end, a selected one of the shaft end and a further motor shaft end projecting outwardly of a hood through a bore formed therein, the hood enclosing the standard fan and being mounted on the bearing bracket of the trunk motor, including being mounted optionally via a bayonet securement and optionally via securement bolts of the bearing bracket, and the shaft end of the first attachment shaft being configured for the mounting thereon of selected accessory pieces such as, for example, a hand wheel or crank lever or so forth which permit a manual positioning or which permit customer attachment of a rotation monitoring device or, additionally, which permit the take-off driving of assistance assemblies such as, for example, a cooling medium pump.

14. A series of motors according to claim 1, wherein the securement bolts are configured as multi-turn bolts and are pre-assembled in the bearing bracket of the trunk motor.

15. A series of motors according to claim 1, wherein the trunk motor is provided with a motor terminal box which is rotatable through respective 90° angles.

16. A series of motors according to claim 1, wherein the series of motors is assembled as component boxes and the bearing bracket on the non-drive side of the trunk motor is provided with securement bolts for the mounting of various hoods.

17. A series of motors according to claim 1 and further comprising an attachment piece associated with each trunk motor, each attachment piece having at least one driveable component having an attachment shaft, and means for interconnecting the attachment shaft of the driveable component and the shaft end of the trunk motor for driving operation of the driveable component by the trunk motor, and the attachment piece itself supporting the driveable component in a shaft aligned position in which the driveable component is supported such that its attachment shaft is axially aligned with the shaft of the trunk motor and the attachment piece being secured to one of the bearing brackets.

18. A series of fabricated products for electrically rotatably driven machines, especially alternating current motors for attachment on drives, having various pole configurations and operable in differing performance classes, voltage classes, and frequency classes, the series comprising: a plurality of trunk motors, each trunk motor including: a motor housing optionally having ribs formed thereon for cooling assistance; stator windings mounted in a rotationally symmetrical manner in the motor housing; a rotor having a shaft; a motor terminal box having a terminal board for the connection thereto of a current supply for the provision of electrical current to the stator windings; a pair of bearing brackets for supporting the shaft of the rotor such that the rotor is disposed within the stator windings at a minimal clearance therefrom sufficient to permit rotation of the rotor relative to the stator windings; a drive side; a non-drive side; and a shaft end extendly outwardly from the non-drive side, the shaft end being adapted for securement thereto of a plurality of differing attachment shafts, the series of motors being configured such that each trunk motor is operable in cooperation with a plurality of differing attachment pieces and accessory pieces connected to the plurality of various attachment shafts and the bearing bracket on the non-drive side of the trunk motor is provided with securement bolts for the mounting of various hoods.

* * * * *